(12) United States Patent
Fries et al.

(10) Patent No.: US 11,109,535 B2
(45) Date of Patent: Sep. 7, 2021

(54) COMBINE HARVESTER INCLUDING A FEEDER HOUSE WITH A LOWER DEFLECTION ROLLER

(71) Applicant: DEERE & COMPANY, Moline, IL (US)

(72) Inventors: Christina Fries, Nohfelden (DE); Friedrich Lauer, Kraehenberg (DE); Eric Loutz, Erching Guiderkirch (FR); Lutz Bischoff, Nuenschweiler (DE); Oliver Klein, Saarwellingen (DE); Dirk Weichholdt, Woelfling les Sarreguemin (FR)

(73) Assignee: DEERE & COMPANY, Moline, IL (US)

( * ) Notice: Subject to any disclaimer, the term of this patent is extended or adjusted under 35 U.S.C. 154(b) by 140 days.

(21) Appl. No.: 16/507,125

(22) Filed: Jul. 10, 2019

(65) Prior Publication Data

US 2020/0022309 A1    Jan. 23, 2020

(30) Foreign Application Priority Data

Jul. 19, 2018 (DE) .......................... 102018212075.7

(51) Int. Cl.
*A01F 12/10* (2006.01)
*A01D 41/127* (2006.01)

(52) U.S. Cl.
CPC ............ *A01F 12/10* (2013.01); *A01D 41/127* (2013.01); *A01D 41/1272* (2013.01); *A01D 41/1274* (2013.01)

(58) Field of Classification Search
CPC ... A01F 12/10; A01D 41/127; A01D 41/1272; A01D 41/1274; A01D 61/008; A01D 41/1271
See application file for complete search history.

(56) References Cited

U.S. PATENT DOCUMENTS 3,073,099 A * 1/1963 Andersen ........... A01D 41/1274
460/6
3,609,947 A * 10/1971 Herbsthofer ....... A01D 41/1274
460/6

(Continued)

FOREIGN PATENT DOCUMENTS

DE          2302787 A1    8/1973
EP          1040750 A1   10/2000

(Continued)

OTHER PUBLICATIONS

European Search Report issued in counterpart European Patent Application No. 19184703.7 dated Nov. 28, 2019 (8 pages).

*Primary Examiner* — Arpad Fabian-Kovacs
(74) *Attorney, Agent, or Firm* — Taft Stettinius & Hollister LLP; Stephen F. Rost

(57) ABSTRACT

A combine harvester includes a load-bearing undercarriage movable via a drivable device engaged in the ground, a threshing and separating device attached to the load-bearing undercarriage, and a feeder house attached to the load-bearing undercarriage. The feeder house includes an endless traction mechanism which circulates about a vertically movable lower deflection roller and a drivable upper deflection roller. A harvesting attachment is coupled to the feeder house for receiving or cutting off harvested crops which are lying or standing upright on a field and which are able to be supplied via the feeder house to the threshing and separating device. An actuator is actuated by an external force arranged for adjusting the vertical position of the lower deflection roller and is connected to a control device which is coupled to a sensor for determining a throughput by a transmission of a signal.

19 Claims, 1 Drawing Sheet

(56) References Cited

U.S. PATENT DOCUMENTS

| | | | | |
|---|---|---|---|---|
| 4,430,847 | A * | 2/1984 | Tourdot | A01D 41/1274 474/1 |
| 6,036,597 | A * | 3/2000 | Amer | A01D 41/127 460/150 |
| 6,116,008 | A * | 9/2000 | Digman | A01D 41/16 56/15.8 |
| 6,315,658 | B1 * | 11/2001 | Weber | A01D 41/127 460/6 |
| 6,834,484 | B2 | 12/2004 | Coers et al. | |
| 6,951,514 | B1 * | 10/2005 | Goers | A01D 41/127 460/1 |
| 9,730,375 | B2 * | 8/2017 | De Coninck | A01B 63/008 |
| 9,795,082 | B2 * | 10/2017 | Middelberg | A01F 12/18 |
| 2002/0137556 | A1 * | 9/2002 | Goers | A01D 41/127 460/7 |
| 2003/0110748 | A1 * | 6/2003 | Goers | A01D 41/127 56/10.2 G |
| 2004/0259610 | A1 * | 12/2004 | Behnke | A01D 41/127 460/59 |
| 2013/0116883 | A1 * | 5/2013 | Kormann | A01B 79/005 701/32.3 |
| 2013/0197767 | A1 * | 8/2013 | Lenz | A01D 41/127 701/50 |
| 2013/0205733 | A1 * | 8/2013 | Peters | A01D 41/127 56/10.1 |
| 2013/0313077 | A1 * | 11/2013 | Boyd | A01D 61/008 198/617 |
| 2014/0215984 | A1 * | 8/2014 | Bischoff | A01D 41/127 56/10.2 R |
| 2015/0230403 | A1 * | 8/2015 | Jung | A01C 23/047 701/50 |
| 2015/0245560 | A1 * | 9/2015 | Middelberg | A01F 12/18 460/7 |
| 2016/0029558 | A1 * | 2/2016 | Dybro | A01B 79/005 56/1 |
| 2017/0086365 | A1 * | 3/2017 | Gonzalez-Mohino | A01D 41/1274 |
| 2018/0007832 | A1 * | 1/2018 | Matousek | A01D 41/16 |
| 2018/0084718 | A1 * | 3/2018 | Baumgarten | A01D 41/1243 |
| 2019/0343044 | A1 * | 11/2019 | Bormann | A01D 41/141 |
| 2020/0008350 | A1 * | 1/2020 | Borsdorf | A01F 12/10 |
| 2020/0163279 | A1 * | 5/2020 | Fries | A01D 41/127 |

FOREIGN PATENT DOCUMENTS

| | | |
|---|---|---|
| EP | 1621064 A1 | 2/2006 |
| EP | 2060165 A1 | 5/2009 |

* cited by examiner

COMBINE HARVESTER INCLUDING A FEEDER HOUSE WITH A LOWER DEFLECTION ROLLER

RELATED APPLICATIONS

This application claims priority to German Patent Application Ser. No. 102018212075.7, filed Jul. 19, 2018, the disclosure of which is hereby incorporated by reference in its entirety.

FIELD OF THE DISCLOSURE

The present disclosure relates to a combine harvester including a load-bearing undercarriage which is movable over a field in a forward direction by drivable means engaged in the ground, a threshing and separating device attached to the load-bearing undercarriage, a feeder house attached to the load-bearing undercarriage comprising an endless traction means which circulates about a vertically movable lower deflection roller and a drivable upper deflection roller and bears driver elements extending transversely to the traction means for the undershot conveyance of harvested crops, and a harvesting attachment which is attached or attachable to the front face of the feeder house for receiving or for cutting off harvested crops which are lying or standing upright on a field and which are able to be supplied via the feeder house to the threshing and separating device.

BACKGROUND

Combine harvesters serve for harvesting grains. The material to be threshed is picked up or cut off from a field by means of a harvesting attachment and supplied by a feeder house to a threshing device which threshes the material and separates the grain. The grain is then cleaned and stored in a grain tank before it is loaded onto a transport vehicle.

The feeder house generally includes a housing in which an undershot-operating conveyer is arranged. The conveyor includes an upper, rotatably driven deflection roller and a lower deflection roller, a pair of endless traction means in the form of chains or flexible belts circulating about said deflection rollers and bearing transversely extending driver elements. The lower deflection roller is generally movable vertically between lower and upper stops, wherein it is possible for the vertical position of the lower stop to be manually alterable by an operator, by mechanical means on the housing of the feeder house (see e.g., DE 23 02 787 A1, EP 1 040 750 A1, EP 1 621 064 A1). The position of the upper stop, however, is fixed. The harvested crops are drawn upwardly by the driver elements below the lower run of the traction means on the floor of the housing and finally transferred directly or by a further conveyor to the threshing device. The adjustment of the position of the lower stop serves for carrying out an adaptation to the field conditions and harvested crop conditions, since the lower stop defines the thickness of the harvested crop mat, at least in the case of low throughputs.

In conventional combine harvesters, the lower deflection roller accordingly moves upwardly counter to its inherent weight, dictated by the harvested crops passing therein, until it strikes against the upper stop. In the case of lower throughputs of harvested crops when the lower deflection roller does not yet bear against the upper stop, the conveying action of the feeder house is accordingly based merely on the inherent weight of the lower deflection roller and the traction means with the driver elements attached thereto. In particular, in the case of a lower stop of the lower deflection roller being set too high, operating situations are conceivable in which a large amount of slippage occurs, which leads to an uneven supply of harvested crops to the threshing device and which has a negative effect on the performance of the combine harvester. Additionally, the adjustment of the position of the lower stop has proved to be problematic since few operators are aware of the significance of the position of the lower deflection roller and are able to set said lower deflection roller according to the respective conditions. Thus, there is a need for a combine harvester which is improved in this regard.

SUMMARY

In the present disclosure, a combine harvester comprises a load-bearing undercarriage which is movable over a field in a forward direction by drivable means engaged in the ground, a threshing and separating device attached to the load-bearing undercarriage, a feeder house attached to the load-bearing undercarriage comprising an endless traction means which circulates about a vertically movable lower deflection roller and a drivable upper deflection roller and bears driver elements extending transversely to the traction means for the undershot conveyance of harvested crops, and a harvesting attachment which is attached or attachable to the front face of the feeder house for receiving or for cutting off harvested crops which are lying or standing upright on a field and which are able to be supplied via the feeder house to the threshing and separating device. An actuator which is actuated by external force is arranged for adjusting the vertical position of the lower deflection roller and is connected to a control device which is additionally coupled to a device for automatic recognition of the type of harvested crops to be harvested in each case or to an input device for the input of the type of harvested crops to be harvested in each case or to a sensor preferably permitting the determination of the predicted throughput by the transmission of signals, and is designed to activate the actuator as a function of the identified or input type of harvested crops or the measured value which is detected by the sensor and which depends directly or indirectly on the throughput. Thus, the sensor may detect the power currently provided by the drive motor.

In other words, it is proposed to adjust the vertical position of the lower deflection roller of the feeder house directly (by attaching the actuator to the rotating axle of the lower deflection roller) or indirectly (i.e., by adjusting the position of a lower or upper stop of the otherwise freely vertically movable lower deflection roller) by means of an actuator. The setting of the actuator is based on the type of harvested crops (which, for example, may be wheat, barley, oats, maize or any other grains) or the throughput in the feeder house detected directly or indirectly by means of a sensor and, in particular, in a predictive manner. To this end, the actuator is connected to a control device which is provided with information regarding the type of harvested crops to be currently harvested. This information may be identified automatically by a suitable device, for example, by a camera and image processing software, or it is supplied by an input device to the control device. To this end, an operator interface may be used or the control device reads the type of harvested crops from a data bank in which the type of harvested crops for the relevant field is input using the position of the combine harvester or a harvesting task supplied to the control device.

In this manner, an automatic adaptation is carried out of the position of the front deflection roller of the feeder house relative to the type of harvested crops or to the throughput, which avoids or at least reduces the problems mentioned in the introduction. As a result, the flow of crops is homogenized, load peaks are avoided and an energy-efficient operation of the combine harvester is possible.

The sensor for detecting the throughput may operate electro-optically (for example, with a (monocular or stereo) camera operating two-dimensionally or three-dimensionally and an image processing system or a laser scanner) and may be designed to detect the standing crop upstream of the harvesting attachment or (when the field has been previously traveled over) adjacent to the combine harvester. The signals of the sensor may also be used for identifying the type of harvested crops. In a further embodiment, the sensor may detect the throughput in the case of a harvesting process which has already taken place earlier. Its measured values which are specific to the location are input into a memory card and recalled again in the subsequent harvesting process, on the basis of the position thereof.

Alternatively or additionally, the sensor is designed to detect the throughput of the harvesting attachment. To this end, the sensor may be designed to detect a drive torque of a conveyor of the harvesting attachment, for example, an auger serving for the transverse conveyance or a transverse or longitudinal conveyor belt of a belt cutting unit. Based on the advancing speed of the combine harvester and other relevant variables, in a manner known per se, the signals of the sensor are converted such that the lower deflection roller is located in the position to be assigned to the sensor value when the throughput which may be assigned to the sensor value passes into the feeder house. There is also the possibility of detecting at any location of the combine harvester a drive torque of an element cooperating with the harvested crops, for example, a threshing or separating device or the drive motor, in order to detect the throughput indirectly.

A threshing gap actuator which is designed for adjusting the threshing gap of the threshing device may be connected to the control device, and the control device may be designed to adjust the threshing gap by activating the threshing gap actuator based on the signal of the sensor or on the type of harvested crops identified or input. Moreover, a separating gap actuator which is designed to adjust the size of an adjustable separating gap of the rotating separating device is connected to the control device and the control device may be designed to adjust the separating gap by activating the separating gap actuator based on the signal of the sensor or on the type of harvested crops identified or input. Accordingly, the throughput or the type of harvested crops detected by the sensor also serves or serve for setting the size of the threshing or separating gap.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
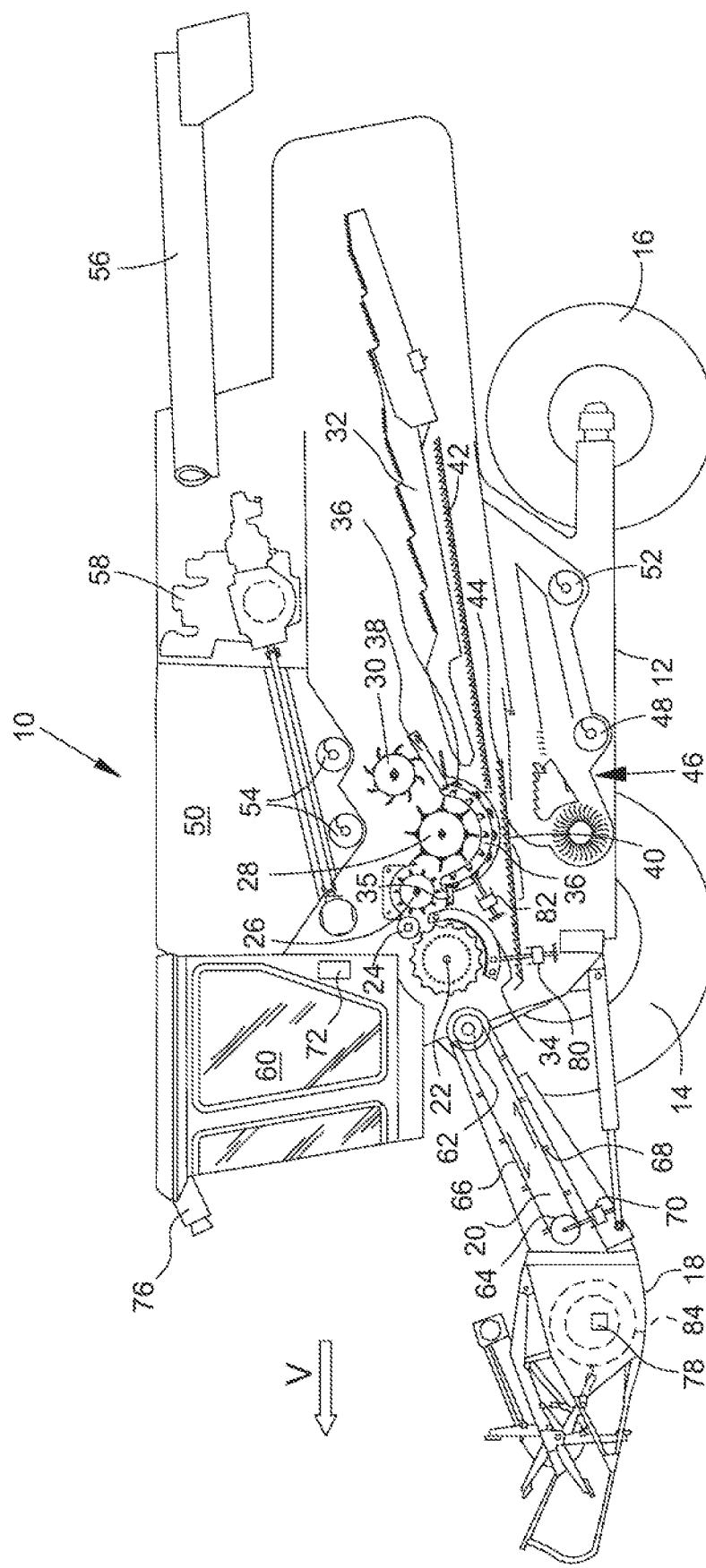
FIG. 1 shows a schematic side view of a combine harvester.

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The self-propelling combine harvester 10 shown in FIG. 1 is provided with a load-bearing undercarriage 12 which is supported on the ground via ground engagement means in the form of driven front wheels 14 and steerable rear wheels 16 and moved forward thereby. The wheels 14 are set in rotation by a drive means or mechanism (not shown) in order to move the combine harvester 10, for example, over a field to be harvested. Directional information, such as front and rear, refer to the direction of travel V of the combine harvester 10 in the harvesting mode.

A harvesting attachment 18 in the form of a cutting tool is removably attached to the front end region of the combine harvester 10, in order to harvest from the field during the harvesting mode harvested crops in the form of grains or other threshable cereals and to supply the harvested crops upwardly and to the rear through a feeder house 20 to a multi-drum threshing tool. The tool may be arranged in succession in the direction of travel V and includes a threshing drum 22, a scraping drum 24, an overshot-operating conveying drum 26, a separating drum 28 and a turning drum 30. A straw agitator 32 is located downstream of the turning drum 30. The threshing drum 22 is surrounded by a threshing concave 34 in its lower and rear region. A cover 35, which is provided with openings or which is closed, is arranged below the conveying drum 26, while a fixed cover is located above the conveying drum 26 and a separating concave 36 with adjustable finger elements is located below the separating drum 28. A finger rake 38 is arranged below the turning drum 30.

A front conveying floor 40 is located below the multi-drum threshing tool. A rear conveying floor 42 is arranged below the straw agitator 32. The conveying floors 40, 42 transport the mixture of kernels, chopped straw and chaff to a cleaning device 46. Grain cleaned by the cleaning device 46 is supplied to an elevator (not shown) by a grain auger 48 which conveys it into a grain tank 50. A return auger 52 discharges ear parts which have not been threshed out, through a further elevator (not shown) back into the threshing process. The chaff may be ejected on the rear face of the screening device by a rotating chaff spreader or it is discharged through a straw chopper (not illustrated) arranged downstream of the straw agitator 32. The cleaned grain may be unloaded from the grain tank 50 by an unloading system with transverse augers 54 and an unloading conveyor 56.

The aforementioned systems are driven by means of an internal combustion engine 58 and monitored and controlled by an operator from a driver's cab 60. The different devices for threshing, conveying, cleaning and separating are located inside the load-bearing undercarriage 12. Outside the load-bearing undercarriage 12 is located an outer casing which is able to be substantially swung out.

The undershot-operating feeder house 20 comprises in a manner known per se an upper deflection roller 62 and a lower deflection roller 64. Around the deflection rollers 62, 64 run flexible traction means 66 which may be chains or flexible conveyor belts, two or more thereof being arranged laterally adjacent to one another and being guided on the deflection rollers 62, 64 by suitable guide features (for example, gearwheels or cams). The traction means 66 are connected together by driver elements 68 extending transversely to the direction of conveyance. The upper deflection roller 62 is rotatably drivable by a suitable drive. The lower deflection roller 64 is mounted at both ends in a vertically movable manner and is height-adjustable in parallel by one respective actuator 70, only one thereof being shown in FIG. 1.

The actuators 70 are coupled to a control device 72 and are monitored thereby. In a manner known per se, the actuators 70 may be assigned in each case a feedback sensor (not shown) which detects the current position of the actuator 70 and reports back to the control device 72 for regulating purposes. The position of the actuator 70 is predetermined by the control device 72, based on signals of an operator input device 74 by which the operator may input the type of harvested crops to be harvested in each case. Additionally, the field is observed upstream of the harvesting attachment 18 by a first sensor 76 in the form of a camera with an image processing system. From the images of the camera, the image processing system evaluates the throughput to be anticipated in each case in the feeder house 20. The image processing system may additionally output signals regarding the type of harvested crops, which complement or replace the inputs of the operator input device 74. The second sensor 78 detects the drive torque of a transverse auger 84 of the harvesting attachment.

The control device 72 accordingly receives signals regarding the type of harvested crops and the throughput in the feeder house 20 and is programmed by these signals to predetermine a set value for the height of the lower deflection roller 64, the signals serving to calculate a set value for the actuator 70 and to use said set value for setting the actuator 70. Accordingly, the vertical position of the lower deflection roller 64 is automatically adapted to the respective harvested crop throughput in the feeder house 20 and adapted to the type of harvested crops.

In a similar manner, the control device 72 additionally adjusts a threshing gap actuator 80 which predetermines the size of the threshing gap between the threshing drum 22 and the threshing concave 34 and a separating gap actuator 82 which predetermines the size of the separating gap between the separating drum 28 and the separating concave 36. The threshing and separating gap are accordingly also automatically adapted to the type of harvested crops and the throughput.

It should also be mentioned that in a manner known per se the control device 72 takes into account the spatial and chronological offset between the harvested crops being detected by the sensors 76, 78 and reaching the feeder house 20, in order to achieve that the setting of the actuators 70 is based on the harvested crops currently passing through and detected by the sensors 76, 78. The same procedure is carried out with the threshing gap actuator 80 and the separating gap actuator 82.

The multi-drum threshing tool shown in FIG. 1 is only an exemplary embodiment and could be replaced by a tangential threshing tool with a single threshing drum and one or more axial separating drums or a straw agitator or one or more axial threshing and separating drums. The threshing gap actuator 80 in this case would set the threshing gap of the tangential threshing drum or the threshing portion of the axial threshing and separating drum. The separating gap actuator 82 would, if required, adjust the gap of the separating drum or the separating portion of the axial threshing and separating drum. The actuators 70, 80 and 82 may be designed as hydraulic cylinders, as shown in FIG. 1, but may also be designed in the form of electromagnetic or pneumatic actuators.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A combine harvester, comprising:
   a load-bearing undercarriage movable over a field in a forward direction by a drivable device engaged to the ground;
   a threshing and separating device attached to the load-bearing undercarriage;
   a feeder house attached to the load-bearing undercarriage and comprising an endless traction mechanism which circulates about a vertically movable lower deflection roller and a drivable upper deflection roller and bears driver elements that extend transversely to the traction mechanism for an undershot conveyance of harvested crops;
   a harvesting attachment attachable to a front face of the feeder house configured to receive or cut off harvested crops in the field and which are able to be supplied via the feeder house to the threshing and separating device; and
   an actuator configured to be actuated by an external force and configured to adjust a vertical position of the lower deflection roller;
   an operator input device configured to accept input of an operator crop type entry;
   a sensor system configured to provide sensor signals; and
   a control device coupled to the sensor system, the operator input device and the actuator; the control device configured to determine a detected crop type and a throughput based on the sensor signals;
   wherein, when the operator crop type entry differs from the detected crop type, the control device is configured to replace the operator crop type entry with the detected crop type;
   wherein, the actuator is activated by the control device as a function of the detected crop type and the throughput detected by the sensor system.

2. The combine harvester of claim 1, wherein the actuator is directly connected to an axle of the lower deflection roller configured to limit vertical movement of the lower deflection roller.

3. The combine harvester of claim 1, wherein the actuator is directly coupled to a stop configured to limit vertical movement of the lower deflection roller.

4. The combine harvester of claim 3, wherein the stop comprises a lower stop or an upper stop.

5. The combine harvester of claim 1, wherein the sensor system comprises an electro-optical sensor configured to detect a standing crop upstream of the harvesting attachment or adjacent to the combine harvester.

6. The combine harvester of claim 1, wherein the sensor system comprises an electro-optical sensor configured to detect a standing crop upstream of the harvesting attachment; and the control device determines the detected crop type based on the detected standing crop.

7. The combine harvester of claim 1, wherein the sensor system is configured to detect a drive torque of a conveyor of the harvesting attachment.

8. The combine harvester of claim 1, wherein the sensor system is configured to detect a shaft in the threshing or separating device.

9. The combine harvester of claim 1, wherein the sensor system is configured to detect an engine power of the combine harvester.

10. The combine harvester of claim 1, further comprising a threshing gap actuator configured to adjust a threshing gap of a threshing portion of the threshing and separating device; the threshing gap actuator connected to the control device.

11. The combine harvester of claim 10, wherein the control device operably adjusts the threshing gap based on the sensor signals or on the detected crop type.

12. The combine harvester of claim 1, further comprising a separating gap actuator configured to adjust a separating gap of a separating portion of the threshing and separating device; the separating gap actuator connected to the control device.

13. The combine harvester of claim 12, wherein the control device operably adjusts the separating gap based on the sensor signals or on the detected crop type.

14. A combine harvester, comprising:
  a load-bearing undercarriage movable over a field in a forward direction by a drivable device engaged to the ground;
  a threshing and separating device coupled to the load-bearing undercarriage;
  a feeder house coupled to the load-bearing undercarriage, the feeder house comprising an endless traction mechanism which circulates about a vertically movable lower deflection roller and a drivable upper deflection roller and bears driver elements that extend transversely to the traction mechanism for a conveyance of harvested crops;
  a harvesting attachment coupled to the feeder house and configured to receive or cut off harvested crops in the field and which are able to be supplied via the feeder house to the threshing and separating device; and
  an actuator configured to be actuated by an external force and configured to adjust a vertical position of the lower deflection roller;
  an operator input device configured to accept input of an operator crop type entry; and
  a control device operably coupled to the actuator and the operator input device, the control device also coupled to a device for automatic recognition of a type of harvested crops to be harvested;
  wherein, when the operator crop type entry differs from the recognized type of harvested crops, the control device is configured to replace the operator crop type entry with the recognized type of harvested crops;
  wherein, the actuator is activated as a function of the recognized type of harvested crops.

15. The combine harvester of claim 14, wherein the actuator is directly connected to an axle of the lower deflection roller configured to limit vertical movement of the lower deflection roller.

16. The combine harvester of claim 14, wherein the actuator is directly coupled to a lower stop or an upper stop configured to limit vertical movement of the lower deflection roller.

17. The combine harvester of claim 14, further comprising a threshing gap actuator configured to adjust a threshing gap of a threshing portion of the threshing and separating device, the threshing gap actuator connected to the control device, wherein the control device operably adjusts the threshing gap based on the recognized type of harvested crops.

18. The combine harvester of claim 14, further comprising a separating gap actuator configured to adjust a separating gap of a separating portion of the threshing and separating device, the separating gap actuator connected to the control device, wherein the control device operably adjusts the separating gap based on the recognized type of harvested crops.

19. A combine harvester, comprising:
  a load-bearing undercarriage movable over a field in a forward direction by a drivable device engaged to the ground;
  a threshing and separating device coupled to the load-bearing undercarriage;
  a feeder house coupled to the load-bearing undercarriage, the feeder house comprising an endless traction mechanism which circulates about a vertically movable lower deflection roller and a drivable upper deflection roller and bears driver elements that extend transversely to the traction mechanism for a conveyance of harvested crops;
  a harvesting attachment coupled to the feeder house and configured to receive or cut off harvested crops in the field and which are able to be supplied via the feeder house to the threshing and separating device;
  an actuator configured to be actuated by an external force and configured to adjust a vertical position of the lower deflection roller;
  a sensor configured to provide sensor signals; and
  a control device operably coupled to the actuator and the sensor, and the control device coupled to an input device for an input type of harvested crops to be harvested;
  wherein the control device is configured to determine a detected crop type to be harvested based on the sensor signals;
  wherein, when the input type of harvested crops differs from the detected crop type, the control device is configured to replace the input type of harvested crops with the detected crop type;
  wherein, the actuator is activated as a function of the type of harvested crops as determined by the control device.

* * * * *